(12) United States Patent
Hendrickson et al.

(10) Patent No.: US 7,780,567 B2
(45) Date of Patent: Aug. 24, 2010

(54) INPUT BRAKE ASSEMBLY

(75) Inventors: James D. Hendrickson, Belleville, MI (US); John A. Diemer, Farmington Hills, MI (US); Craig S. Ross, Ypsilanti, MI (US); Michael H. Pohl, Canton, MI (US); Robert K. Dunlap, Greenwood, IN (US); Alan G. Holmes, Clarkston, MI (US)

(73) Assignee: GM Global Technology Operations, inc., Detroit, MI (US)

( * ) Notice: Subject to any disclaimer, the term of this patent is extended or adjusted under 35 U.S.C. 154(b) by 546 days.

(21) Appl. No.: 11/759,432

(22) Filed: Jun. 7, 2007

(65) Prior Publication Data

US 2008/0305907 A1 Dec. 11, 2008

(51) Int. Cl.
*F16H 3/44* (2006.01)
(52) U.S. Cl. ............................ 475/317; 475/297
(58) Field of Classification Search .............. 475/5, 475/297, 301, 303, 317
See application file for complete search history.

(56) References Cited

U.S. PATENT DOCUMENTS

| | | | | |
|---|---|---|---|---|
| 4,662,233 A | * | 5/1987 | Mazzorana | .................. 74/7 A |
| 5,147,255 A | * | 9/1992 | Strehler et al. | .............. 475/311 |
| 5,323,665 A | | 6/1994 | Rediker, Jr. | |
| 5,398,562 A | | 3/1995 | Muchmore | |
| 5,482,512 A | | 1/1996 | Stevenson | |
| 6,114,771 A | | 9/2000 | Takagi et al. | |
| 6,318,513 B1 | * | 11/2001 | Dietrich et al. | ............. 188/72.7 |
| 6,485,390 B2 | * | 11/2002 | Inoue | .......................... 475/313 |
| 6,935,985 B2 | * | 8/2005 | Ishimaru | ...................... 475/296 |
| 7,448,701 B2 | * | 11/2008 | Nilsson et al. | .............. 303/167 |

* cited by examiner

*Primary Examiner*—Ha D. Ho
(74) *Attorney, Agent, or Firm*—Quinn Law Group, PLLC

(57) ABSTRACT

An input brake assembly is provided for selectively grounding a transmission input member. The packaging location of the input brake assembly does not interfere with, and thus still allows the option of providing a bypass clutch for a flex plate-type flywheel connecting the engine with the transmission input member. The input brake assembly includes a flywheel, preferably a flex plate, for transferring rotary torque between the engine and the transmission input member and a ring gear secured to the outer periphery of the flex plate. A pinion gear is axially movable into and out of meshing engagement with the ring gear. A grounding device is operatively connected to the pinion gear and is operable to prevent rotation of the pinion gear, thereby braking the flex plate as well as the transmission input member operatively connected thereto when the pinion gear is in meshing engagement with the ring gear.

17 Claims, 3 Drawing Sheets

INPUT BRAKE ASSEMBLY

TECHNICAL FIELD

The invention relates to an input brake assembly for selectively braking an input member of a transmission, specifically to provide reaction torque in a hybrid transmission.

BACKGROUND OF THE INVENTION

A vehicle powertrain typically includes an engine operatively connected with a transmission that provides multiple speed ratios between the transmission input member and the transmission output member. Flex plates or flywheels are often provided as a drive connection between the engine output member (e.g., the crankshaft) and the transmission input member. Dampening mechanisms such as torsional springs are sometimes provided to isolate torsional oscillations of the engine, preventing their effect on the smooth feel of the transmission. A selectively engagable dampener bypass clutch is sometimes provided to directly connect the engine output member with the transmission input member, such as when the transmission is a hybrid transmission and the engine may be started by a motor/generator, to reduce the tendency for the torsional springs to oscillate during engine startups and shutdowns. An electric starter motor is sometimes used to start the engine and may be drivingly connected with the engine by moving a pinion gear into meshing engagement with a ring gear that is connected for common rotation with the flex plate.

Electromechanical transmissions having two motor/generators are often configured so that one of the motor/generators can provide driving torque for the engine output member during engine-off operation, but the other motor/generator requires reaction torque from the input member to also provide driving torque to the output member.

SUMMARY OF THE INVENTION

In order to provide highly efficient transmission operation, especially during engine-off operation of a hybrid transmission, an input brake assembly is provided for selectively braking the transmission input member to provide reaction torque for a motor/generator and preventing the transfer of rotary torque from the transmission input member to the engine. The packaging location of the input brake assembly does not interfere with, and thus still allows the option of providing, a bypass clutch selectively engagable to connect an engine flywheel with a transmission input member as an alternative to a dampener assembly that otherwise operatively connects the flywheel with the transmission input member. Preferably, the flywheel is a flexible-type flywheel, referred to herein as a flex plate. As used herein, the term "flywheel" includes a "flex plate".

Specifically, the input brake assembly includes a flywheel for transferring rotary torque between the engine and the transmission and a ring gear secured to the outer periphery of the flywheel. A pinion gear is axially movable into and out of meshing engagement with the ring gear. A grounding device is operatively connected to the pinion gear and is operable to prevent rotation of the pinion gear, thereby braking the flywheel, and therefore the transmission input member operatively connected thereto, preventing rotary transfer thereby when the pinion gear is in meshing engagement with the ring gear. Preferably, the grounding device is substantially axially aligned with the pinion gear.

The input brake assembly may include an electric solenoid that is configured for axial movement when energized. A lever mechanism may be used to connect the electric solenoid with the pinion gear such that axial movement of the electric solenoid causes axial movement of the pinion gear into and out of meshing engagement with the ring gear. This would allow the electric solenoid and the grounding device to be packaged relative to the pinion gear, the engine, and the flywheel similarly to packaging of current solenoid-actuated starter motors. Accordingly, existing engine and/or transmission casing or housing mounting arrangements could be used with the input brake assembly. When energized, the electric solenoid may move axially from an unenergized to an energized position, causing the lever mechanism to move the pinion gear from an unmeshing to a meshing position with respect to the ring gear. Preferably, a biasing element, such as a spring, is provided to return the solenoid to the unenergized position when the solenoid is no longer energized, thus moving the pinion gear back to the unmeshing position. The one-way clutch may also aid in the disengagement of the pinion gear once the solenoid is no longer energized.

In one embodiment, the grounding device includes a splined shaft that is grounded to a stationary housing member, such as a casing for the transmission or the engine, as well as a splined collar in meshing engagement with the splined shaft. The splined collar is connected for meshing engagement with the pinion gear. The engagement of the splined collar with the grounded splined shaft prevents rotation of the splined collar, thereby preventing rotation of the pinion gear and other components, such as the ring gear and transmission input member, that are selectively operatively connected (e.g., by intermeshing with) the pinion gear. Optionally, a one-way clutch is used to connect the splined collar with the pinion gear, thereby allowing rotation of the pinion gear relative to the splined collar in one direction, but preventing relative rotation in the opposing direction. The relative rotation provided by the one-way clutch may improve the ease with which the pinion gear meshes with the ring gear, as a slight rotation may be required in order to align the pinion teeth with the ring gear teeth for meshing.

In another embodiment, the grounding device is an electromagnetic clutch. Axial movement of the electric solenoid electrically connects the electric solenoid with the electromagnetic clutch to thereby prevent rotation of the pinion gear. Those skilled in the art will readily understand the ability of an electromagnetic clutch to achieve frictional engagement when electrically energized.

In still another embodiment, the grounding device is a one-way clutch. An electric starter motor is axially aligned with the one-way clutch and the pinion gear and is selectively energizable for rotating the pinion gear when the pinion gear is engaged with the ring gear to thereby transfer rotary torque via the flywheel to the engine. By preventing rotation of the pinion gear in one direction of rotation, the transmission input member is braked in that direction.

The different embodiments of the input brake assembly described above may be incorporated as part of a powertrain that includes an engine having an engine output member, a transmission having a transmission input member, and the flywheel described above connected for rotation with the engine output member for transferring rotary torque between the engine output member and the transmission input member.

The transmission may be a hybrid electrically-variable transmission having first and second motor/generators and at least one planetary gear set interconnected to provide electrically-variable powerflow between the transmission input member and a transmission output member. With the grounding device operable to prevent rotation of the pinion gear, and thereby prevent rotation of the transmission input member, the first and second motor/generators may both be operated as motors, both providing torque to the transmission output member, without the torque of either of the motor/generators being limited by the internal friction of the engine, and without either motor/generator being required to provide reaction torque to hold the transmission input member still, as the grounding device carries out that function when the powertrain is operated in an "engine-off" state (i.e., the engine is not powered and the motor/generators provide the rotary torque to power the output member). Such operation increases the engine-off vehicle acceleration rate and reduces the thermal demand on the motor/generators. Fuel economy may also be improved and emissions reduced. The hybrid electrically-variable transmission may be a "plug-in" transmission, i.e., a transmission that uses a battery to receive power from or provide power to the motor/generators, with the battery configured to be operatively connectable with an offboard power supply for recharging the battery.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
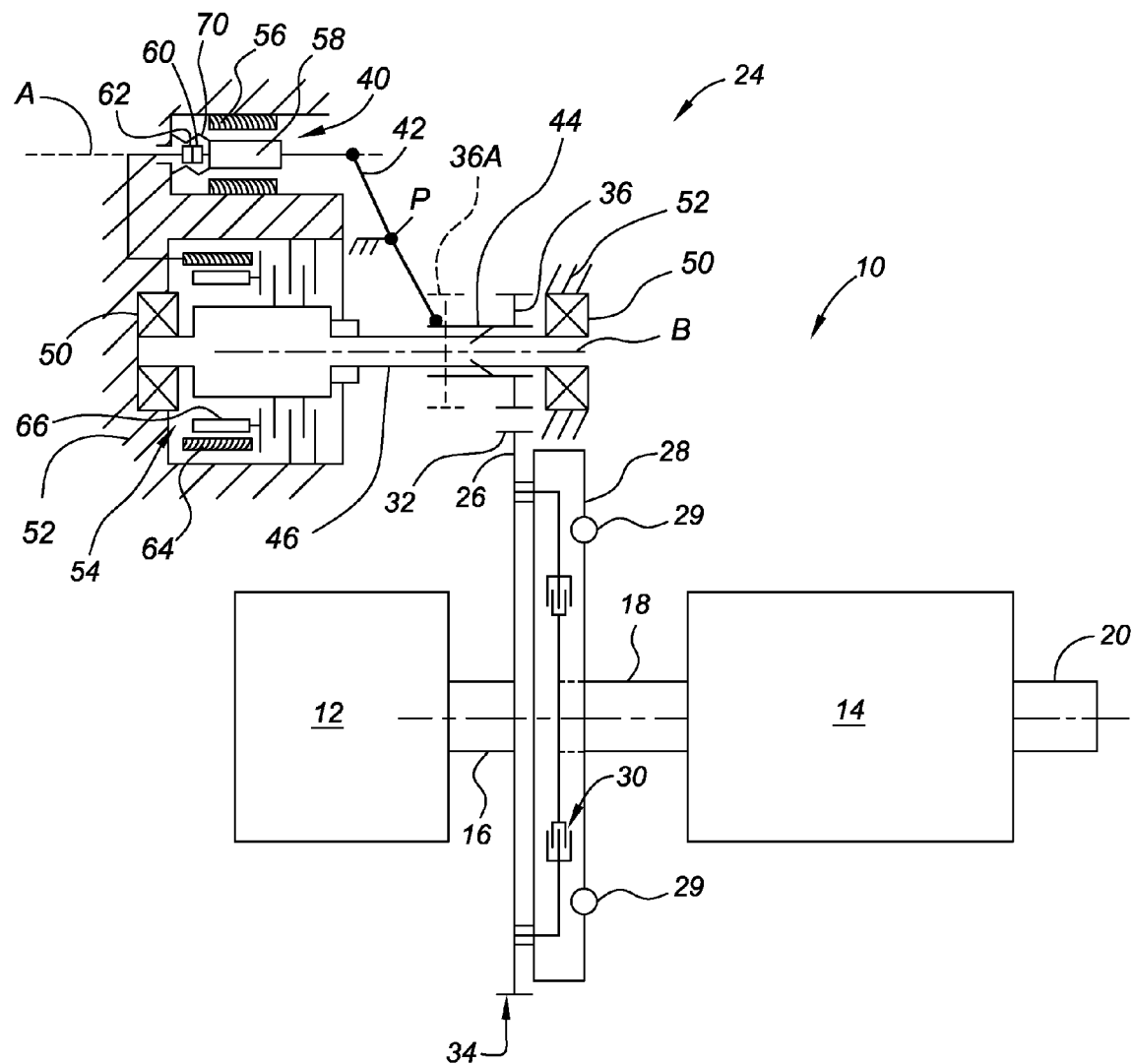
FIG. 1 is a schematic representation of a first powertrain having a first embodiment of an input brake assembly within the scope of the invention.

Referring to FIG. 1, a powertrain 10 is illustrated having an engine 12 that provides driving torque to a transmission 14. Preferably, the transmission 14 is a hybrid electromechanical transmission having two motor/generators and a gearing arrangement, such as is shown and described with respect to transmission 214 of FIG. 3. An engine output member 16 provides rotary driving torque to a transmission input member 18 which is then fed to an output member 20 of the transmission 14 at electrically variable or fixed speed ratios.

An input brake assembly 24 connects the engine output member 16 with the transmission input member 18 and is operable for selectively braking the transmission input member 18, which allows motor/generators within the transmission 14 to power the transmission output member 20 in tandem, without requiring either of the motor/generators to expend power braking the transmission input member 18 during engine-off operating conditions, and without the torque provided by either motor/generator being limited to the internal friction of the engine 12. The input brake assembly 24 includes a flywheel, which in this embodiment is a flex plate 26, secured for rotation with the engine output member 16. The flex plate 26 is connected for rotation with a dampener assembly 28 that is connected with the transmission input member 18 and provides torsional damping between the engine 12 and transmission 14, such as by springs 29, as is known in the art. A bypass clutch 30 is selectively engagable to connect the flex plate 26 with the transmission input member 18 in a more rigid manner, bypassing the damping characteristics of the dampener assembly 28. Those skilled in the art will readily understand the function and operation of the flex plate 26, dampener assembly 28 and bypass clutch 30.

The input brake assembly 24 further includes a ring gear 32 secured at an outer periphery 34 of the flex plate 26. The ring gear 32 and flex plate 26 may be integral or may be separate components. The input brake assembly 24 further includes a pinion gear 36 that is meshingly engaged with the ring gear 32 when in the engaged position shown, and is axially movable to a disengaged position, indicated in phantom as 36A, via movement of an electric solenoid 40. The solenoid 40 is connected via a lever mechanism 42 to a sleeve 44 that secures the pinion gear 36 for common rotation with a shaft 46. Shaft 46 is supported at either end by bearings 50 for rotation with respect to a stationary housing 52. The stationary housing 52 may be, for example, a portion of an engine block, a transmission casing, or a cover member secured to the engine block or transmission casing. The stationary housing 52 may be one component or different, separate components.

The input brake assembly 24 further includes a grounding device 54, which in this embodiment is an electromagnetic clutch, which is selectively engaged via the axial movement of the solenoid 40. Specifically, the electric solenoid 40 has a coil mechanism 56 that is selectively electrically powered or energized to cause a body portion 58 of the solenoid 40 to move leftward along axis A, to the engaged position shown, until a first contact 60 secured to the body portion 58 is in contact with a second contact 62 that is electrically connected with a stator portion 64 of the electromagnetic clutch 54, energizing the stator portion 64 and causing an actuator portion 66 of the clutch 54 to engage clutch plates connected with shaft 46 with clutch plates connected with the stationary housing 52, thus grounding the shaft 46 to the stationary housing 52. Alternatively, the energizing of the stator portion 64 could be controlled independently of the energizing of the solenoid 40, such as by a separate signal from the controller, to decouple the energizing of the electromagnetic clutch 54 from the pinion engagement. Axial movement of the solenoid body portion 40 to the left, energized position shown in FIG. 1 causes lever mechanism 42 to pivot counterclockwise about grounded fulcrum or pivot point P from a more vertical orientation associated with a disengaged, unmeshing position of the pinion illustrated in phantom as 36A (as illustrated by the similar lever mechanism 242 of FIG. 3), moving the pinion gear axially to the right along axis of rotation B from the disengaged position 36A to the engaged, meshing position 36. The grounding of shaft 46 via the electromagnetic clutch 54 also grounds the pinion gear 36, which is connected for common rotation with the shaft 46, as well as the ring gear 32, flex plate 26, the engine output member 16 and the transmission input member 18. With the transmission input member 18 grounded, during engine-off operating conditions, any additional power sources within the transmission 14, such as electric motor/generators, may be used to provide torque to power the transmission output member 20 without being limited to the internal friction of the engine 12, and need not be used to provide reaction torque to hold the transmission input member 18 still. A more detailed description of such a hybrid electromechanical transmission is provided herein with respect to FIG. 3.

Because the input brake assembly 24 is sized similar to known starter motor and starter gear assemblies and is located in a similar location with respect to the engine (i.e., aligned with a pinion gear that moves into engagement with a ring gear on the flex plate), with the solenoid 40 and grounding device 54 spaced from one another in different cavities of the stationary housing 52, the stationary housing 52 of the input brake assembly 24 can use existing engine mounting pads designed for a starter motor and solenoid to mount to a pre-designed engine block (i.e., there is not necessarily a need to retool an engine block in order to implement the various input brake assemblies described herein).

When a controller (not shown in FIG. 1, but shown and described with respect to the embodiment of FIG. 3) determines that operating conditions of a vehicle with powertrain 10 no longer warrant engine-off operation and/or braking of the input member 18, an electrical signal to the coil mechanism 56 is discontinued. The actuation force holding the body portion 58 to the left, energized position ceases, and a biasing element connected with body portion 58, such as a spring 70, which was moved to a compressed position shown in FIG. 1, returns to an elongated, untensioned position. This moves the body portion 58 axially to the right of the position shown in FIG. 1 separating the contacts 60 and 62, and causing lever mechanism 42 to pivot clockwise about point P, thereby sliding pinion gear to the unmeshing position 36A. This allows the ring gear 32 to rotate as necessary to transfer torque from the engine output member 16 to the transmission input member 18.

Figure 2:
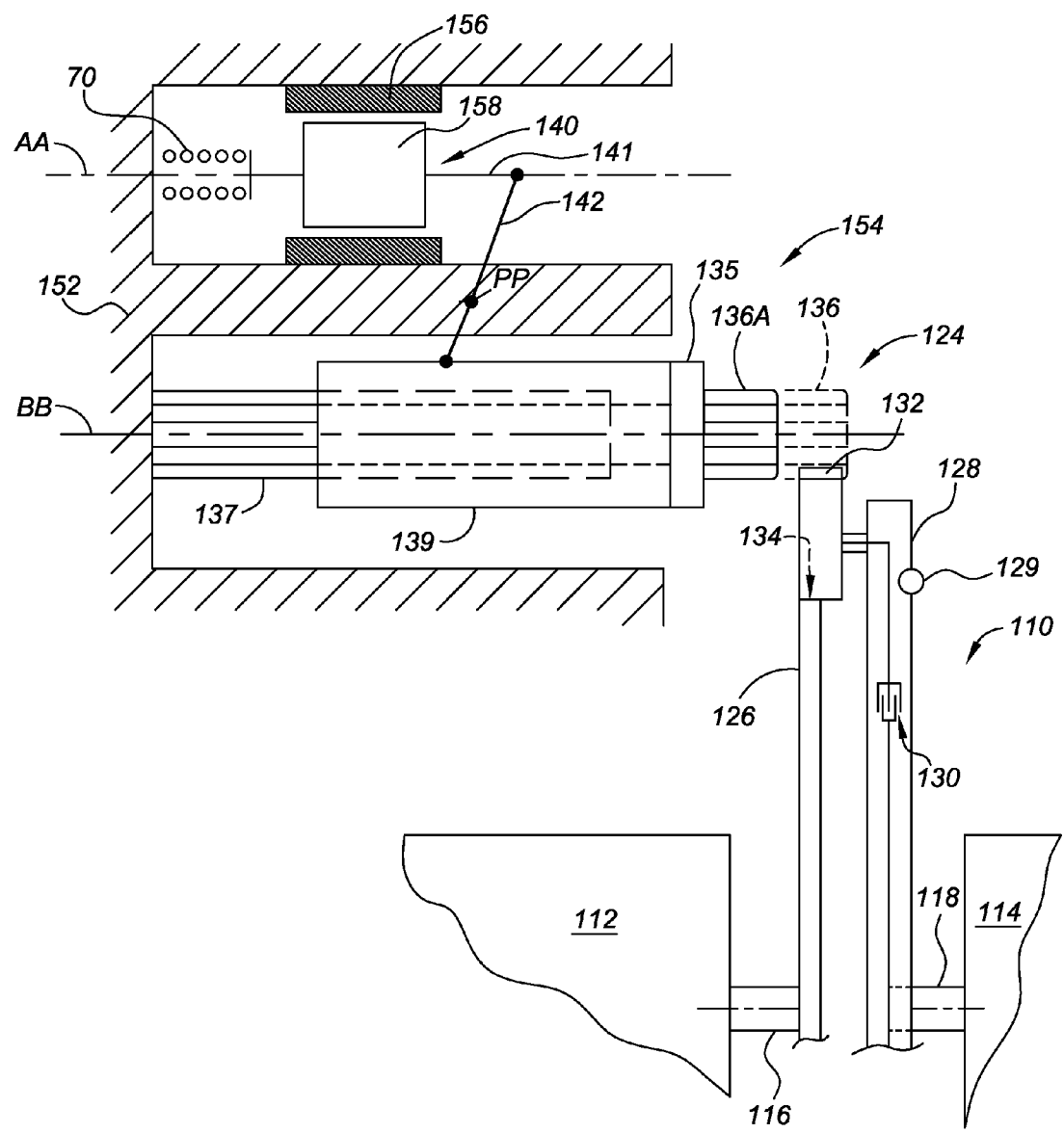
FIG. 2 is a schematic representation of a second powertrain having a second embodiment of an input brake assembly within the scope of the invention.

Referring to FIG. 2, another embodiment of a powertrain 110 includes an engine 112 operatively connected to a transmission 114 via a flywheel, which in this embodiment is a flex plate 126, concentrically rotatable with the engine output member 116 and a dampener assembly 128 (including springs 129) connected for rotation with the transmission input member 118. The engine 112 and transmission 114 are shown in fragmentary view only. It should be appreciated that the engine 112 and transmission 114 are similar to those described with respect to FIGS. 1 and 3. For example, the transmission 114 has an output member (not shown) and may be a hybrid electrically-variable transmission or another type of transmission. A bypass clutch 130 is selectively engagable to allow torque transfer from output member 116 to input member 118 without the dampening affect of dampener assembly 128. The flex plate 126 and dampener assembly 128 are part of an input brake assembly 124 that also includes ring gear 132 at an outer periphery 134 of flex plate 126, as well as outwardly-splined grounded shaft 137 that is grounded to stationary housing 152. Stationary housing 152 may be an engine block, a transmission casing, or a cover connected thereto. The input brake assembly 124 further includes inwardly-splined collar 139 that is axially movable along and meshes with outwardly-splined grounded shaft 137. Because splined shaft 137 is grounded, collar 139 cannot rotate. A pinion gear shown in an unengaged, unmeshing position in which it is referred to as 136A is axially aligned with splined collar 139 and is connected therewith via a one-way clutch 135. The one-way clutch 135 permits rotation of the pinion gear 136A in one direction about axis BB with respect to splined collar 139, but prevents rotation of the pinion gear 136A with respect to the splined collar 139 in the other direction. The one-way clutch 135 is optional; the pinion gear 136A could alternatively be connected directly to the splined collar 139. In that case, the pinion gear 136A would not be rotatable in either direction.

The input brake assembly 124 includes lever mechanism 142 that pivots about grounded fulcrum or pivot point PP and is pivotally connected to splined collar 139 and solenoid support 141. An electric solenoid 140, identical in function and design as solenoid 40 of FIG. 1, may be energized via a stator portion 156 to move a solenoid body portion 158 axially to the left along axis AA along with solenoid support 141 to which solenoid body portion 158 is rigidly connected. This movement causes compression of biasing element or spring 70, and movement of the splined collar 139 to the right, which in turn causes pinion gear 136A to move from the unengaged, unmeshing position to the engaged, meshing position in which it is shown in phantom as 136 and in which it meshes with ring gear 132. Because the splined collar 139 cannot rotate with respect to the splined shaft 137, the engaged pinion gear 136 and ring gear 132 effectively brake the engine output member 116 and transmission input member 118 when the solenoid 140 is energized. When a controller (not shown) determines that operating conditions of a vehicle having powertrain 110 no longer warrant braking of the input member 118, electrical power flow to the solenoid 140 is terminated, and the solenoid body portion 158 moves axially to the right (to the position shown in FIG. 2) via stored energy in the compressed spring 70. This solenoid movement moves the pinion gear to the unengaged position 136A via the lever mechanism 142 so that the input member 118 is no longer held stationary.

Because the input brake assembly 124 is sized similar to known starter motor with starter gear assemblies and is located in a similar location with respect to the engine 112 (i.e., aligned with a pinion gear 136 that moves into engagement with a ring gear 132 on the flex plate 126), with the solenoid 140 and grounding device 154 spaced from one another in different cavities of the stationary housing 152, the stationary housing 152 of the input brake assembly 124 can use existing engine mounting pads designed for a starter motor to mount to a predesigned engine block (i.e., there is not necessarily a need to retool an engine block in order to implement the various input brake assemblies described herein).

Figure 3:
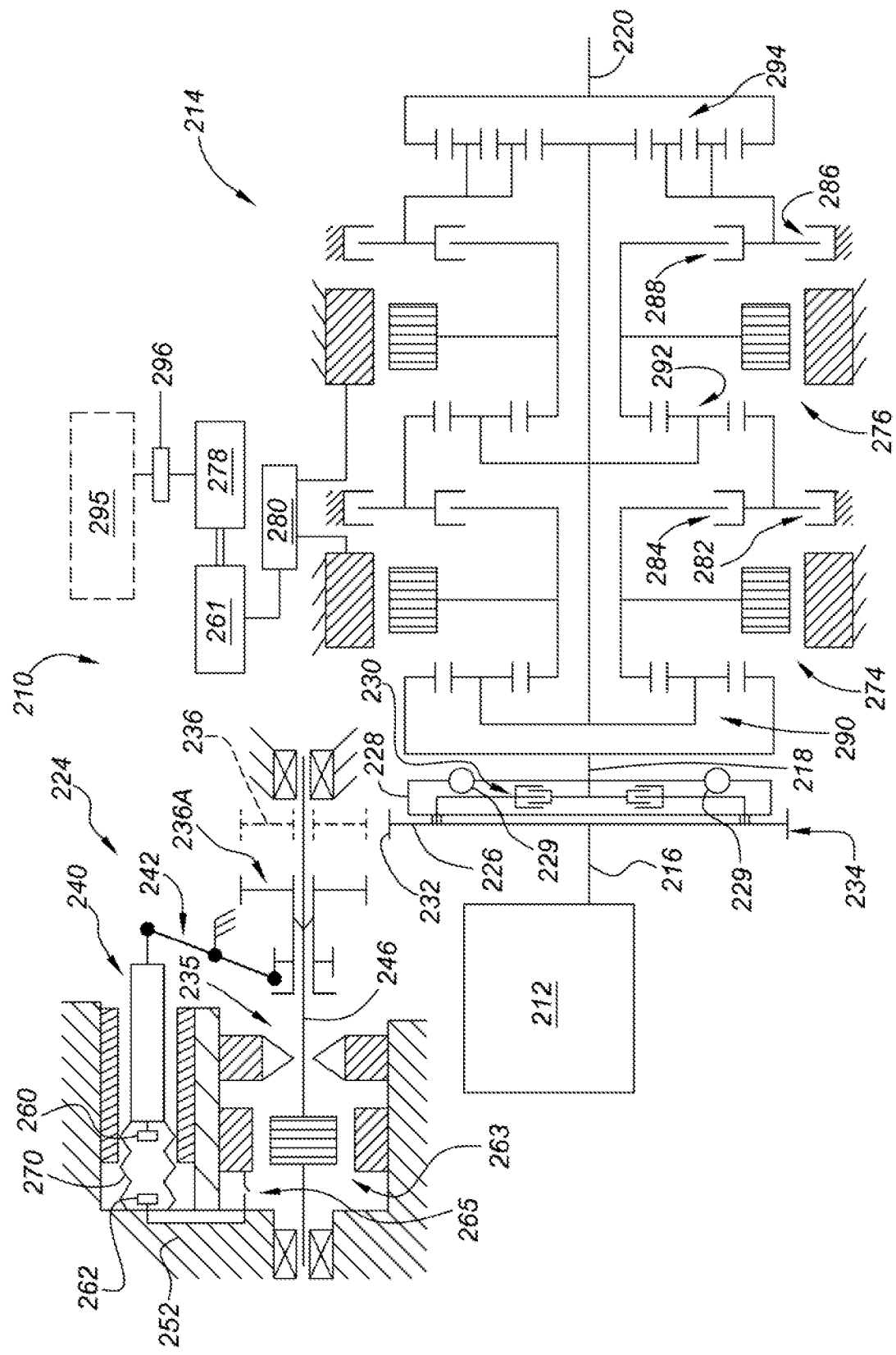
FIG. 3 is a schematic representation of a third powertrain having a third embodiment of an input brake assembly within the scope of the invention.

Referring to FIG. 3, another powertrain 210 is illustrated including an engine 212 operatively connected to a transmission 214 via a flywheel, which in this embodiment is a flex plate 226, concentrically rotatable with an engine output member 216 and a dampener assembly 228 (including springs 229) connected for rotation with a transmission input member 218. A bypass clutch 230 is selectively engagable to allow torque transfer from engine output member 216 to transmission input member 218 without the dampening affect of dampener assembly 228. The flex plate 226 and dampener assembly 228 are part of an input brake assembly 224 that also includes ring gear 232 at an outer periphery 234 of flex plate 226. An electric solenoid 240 operates in identical fashion as solenoid 40 of FIG. 1 to move axially from an unenergized position (shown) to an energized position in which contacts 260 and 262 touch and a lever mechanism 242 pivots to move a pinion gear from an unengaged, unmeshing position in which the pinion gear is referred to as 236A to an engaged, meshing position, illustrated in phantom as 236, in which the pinion gear 236 meshes with ring gear 232 secured to an outer periphery 234 of flex plate 226. When operating conditions warrant, a controller 261 sends control signals to battery 278 (or to another voltage source not shown) to energize the solenoid 240 (connection of battery 278 to solenoid 240 not shown in FIG. 3 for purposes of clarity in the drawing). When the solenoid 240 is in the energized position, an electric circuit is created to a starter motor 263, assuming that a switch 265 is closed by the controller 261 (switch 265 shown open in FIG. 3; connection of controller 261 to switch 265 not shown in FIG. 3 for purposes of clarity in the drawing). The starter motor 263 then turns shaft 246 which rotates commonly with the engaged pinion gear 236 to rotate the ring gear 232, flex plate 226 and engine output member 216 to start the engine 212. Alternatively, when operating conditions indicate that the transmission input member 218 should be braked and the powertrain 210 operated in an engine-off condition, switch 265 may be opened via controller 261 so that the pinion gear remains in the engaged position 236 but the starter motor 263 is not powered. Instead of powering the starter motor 263, a control signal is sent from the controller 261 to a grounding device, one-way clutch 235, that prevents the shaft 246 and therefore the pinion gear 236, ring gear 232, flex plate 226 and transmission input member 218 from rotating in one of a clockwise or counterclockwise direction. The one-way clutch 235 could alternatively be replaced with an electromagnetic clutch similar in function and design to electromagnetic clutch 54 of FIG. 1. The solenoid 240 and starter motor 263 and one-way clutch 235 are packaged in different cavities of a stationary housing 252, such as an engine block, a transmission casing, or a housing or cover that is mounted to an engine block or transmission casing. Under those conditions, first and second motor/generators 274, 276 of the transmission 214 may be powered via stored electrical energy from a battery 278, routed through the controller 261 and an inverter 280, to operate both motor/generators 274, 276 as motors to add torque at the transmission output member 220 by engagement of different ones of torque-transmitting mechanisms 282, 284, 286 and 288 and through planetary gear sets 290, 292 and 294. Those skilled in the art of transmission design will recognize transmission 214 as a hybrid electromechanical electrically-variable transmission.

If it is no longer necessary to maintain the pinion gear in the engaged position 236 (either because the engine 212 has started or because engine-off operation is no longer warranted under the operating conditions, electrical power flow to the solenoid 240 is terminated, and a spring 270 which was compressed when the solenoid 240 moved to the energized position now biases the solenoid 240 back to the unengaged, unmeshing position shown in FIG. 3, moving the pinion gear to the unengaged position 236A.

The transmission 214 is configured so that an offboard power supply system 295 may be connected with the battery 278 for recharging of the battery 278. The offboard power supply system 295 connects with the battery 278 via an interface 296. The interface 296 may be a plug, in which case an onboard charger (not shown) would be electrically connected between the plug and the battery 278. Such a transmission is referred to as a plug-in hybrid. Alternatively, the interface 296 may be conductive, in which case an offboard charger may be connected between the offboard power supply 295 and the interface 296, or inductive, in which case an offboard inductive charger would be connected between the offboard power supply 295 and the interface 296.

As used herein, an "offboard" power supply means a power supply that is not mounted onboard of a vehicle having any of the transmission embodiments described herein. When the battery 278 is sufficiently recharged, the connection through interface 296 is terminated, and the recharged battery 278 is then used under the control of controller 261 to power the motor/generators 274, 276, such as in an electric-only mode (i.e., an operating mode in which only the motor/generators and not the engine, power the vehicle).

While the best modes for carrying out the invention have been described in detail, those familiar with the art to which this invention relates will recognize various alternative designs and embodiments for practicing the invention within the scope of the appended claims.

The invention claimed is:

1. An input brake assembly for grounding a transmission input member that operatively connects an engine and a transmission, comprising:
    a flywheel for transferring rotary torque between the engine and the transmission input member;
    a ring gear secured to the flywheel at an outer periphery thereof;
    a pinion gear axially movable into and out of meshing engagement with the ring gear; and
    a grounding device operatively connected to the pinion gear and operable for preventing rotation thereof, thereby braking the flywheel, and the transmission input member operatively connected thereto, when the pinion gear is in meshing engagement with the ring gear.

2. The input brake assembly of claim 1, wherein the grounding device is substantially axially aligned with the pinion gear.

3. The input brake assembly of claim 1, wherein the grounding device includes:
    a splined shaft grounded so as to be substantially nonrotatable; and
    a splined collar in meshing engagement with the splined shaft and connected for axial movement with the pinion gear.

4. The input brake assembly of claim 3, further comprising:
    a one-way clutch operatively connecting the splined collar with the pinion gear; and wherein the one-way clutch permits rotation of the pinion gear relative to the splined collar in one direction and prevents such relative rotation in an opposite direction.

5. The input brake assembly of claim 1, further comprising:
    an electric solenoid configured for axial movement when energized; and
    a lever mechanism operatively connecting the electric solenoid with the pinion gear such that axial movement of the electric solenoid causes axial movement of the pinion gear into and out of meshing engagement with the ring gear.

6. The input brake assembly of claim 5, wherein the grounding device is an electromagnetic clutch; and wherein the axial movement of the electric solenoid electrically connects the electric solenoid with the electromagnetic clutch to thereby prevent rotation of the pinion gear.

7. The input brake assembly of claim 5, wherein the solenoid moves axially when energized from an unenergized position in which the pinion gear is out of meshing engagement with the ring gear to an energized position in which the pinion gear is in meshing engagement with the ring gear, and further comprising:
    a biasing element configured to return the solenoid to the unenergized position when the solenoid is no longer energized.

8. The input brake assembly of claim 1, wherein the grounding device is a one-way clutch, and further comprising:
    an electric starter motor axially aligned with the one-way clutch and the pinion gear and selectively energizable for rotating the pinion gear when the pinion gear is engaged with the ring gear to thereby transfer rotary torque via the flywheel to the engine.

9. The input brake assembly of claim 1, further comprising:
    a dampener assembly operatively connecting the flywheel with the transmission input member; and
    a bypass clutch selectively engagable to connect the flywheel with the transmission input member in lieu of the dampener assembly to transfer rotary torque from the engine to the transmission input member.

10. A powertrain comprising:
an engine having an engine output member;
a transmission having a transmission input member;
a flywheel connected for rotation with the engine output member for transferring rotary torque between the engine output member and the transmission input member;
a dampener assembly connecting the flywheel with the transmission input member;
a ring gear secured to the flywheel at an outer periphery thereof;
a pinion gear axially movable into and out of meshing engagement with the ring gear; and
a grounding device operatively connected to the pinion gear and operable for preventing rotation thereof, thereby braking the flywheel and preventing rotation of the transmission input member when the pinion gear is in meshing engagement with the ring gear.

11. The powertrain of claim 10, wherein the transmission is a hybrid electrically-variable transmission having:
a transmission output member;
a first and a second motor/generator; and
at least one planetary gear set; wherein the first motor/generator, the second motor/generator and said at least one planetary gear set are interconnected to provide electrically-variable powerflow between the transmission input member and the transmission output member; and
wherein the first and second motor/generators are operable as motors that both provide torque to the transmission output member when the grounding device prevents rotation of the transmission input member.

12. The powertrain of claim 11, further comprising,
a battery operatively connected to the motor/generators for providing power to and receiving power from the motor/generators; and wherein the battery is configured to be operatively connectable with an offboard power supply for recharging the battery.

13. The powertrain of claim 10, wherein the grounding device includes:
a splined shaft grounded so as to be substantially nonrotatable; and
a splined collar in meshing engagement with the splined shaft and connected for axial movement with the pinion gear.

14. The powertrain of claim 10, further comprising:
a bypass clutch selectively engagable to transfer rotary torque from the engine to the transmission in lieu of the dampener assembly.

15. The powertrain of claim 10, further comprising:
an electric solenoid configured for axial movement when energized or deenergized;
wherein the grounding device is an electromagnetic clutch; and wherein the axial movement of the electric solenoid electrically connects the electric solenoid with the electromagnetic clutch to thereby prevent rotation of the pinion gear.

16. The powertrain of claim 10, wherein the grounding device is a one-way clutch, and further comprising:
an electric starter motor axially aligned with the one-way clutch and the pinion gear and selectively energizable for rotating the pinion gear when the pinion gear is engaged with the ring gear to thereby transfer rotary torque via the flywheel to the engine.

17. A powertrain comprising:
an engine having an output member;
a hybrid transmission having a transmission input member, a transmission output member, first and second motor/generators and a gearing arrangement configured to provide electrically-variable torque between the transmission input member and the transmission output member;
a flex plate operatively connected for rotation with the engine output member;
a dampener assembly connecting the flex plate with the transmission input member;
a bypass clutch selectively engagable to permit torque transfer from the flex plate to the transmission input member in lieu of the dampener assembly;
a ring gear secured to an outer periphery of the flex plate for rotation wherewith;
a pinion gear selectively axially movable into and out of meshing engagement with the ring gear; and
a braking mechanism operatively connected with the pinion gear and configured to prevent rotation of the pinion gear when the pinion gear is in meshing engagement with the ring gear, thereby preventing rotation of the transmission input member and allowing both motor/generators to operate as motors in tandem to provide torque at the transmission output member.

* * * * *